Figure 1:
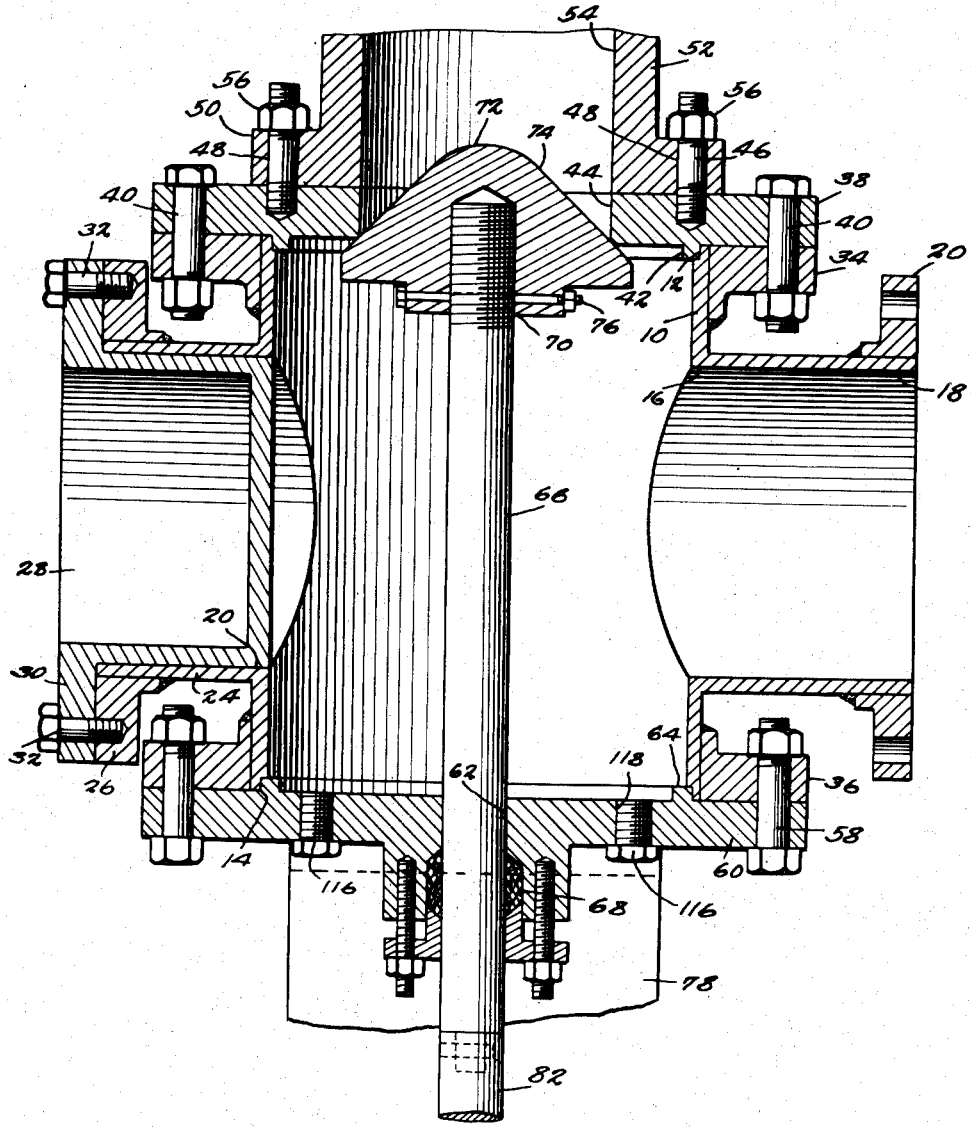

Jan. 12, 1954     L. PRATT     2,665,712
FLUID PRESSURE ACTUATED VALVE WITH STOP MEANS
Filed July 5, 1951     2 Sheets-Sheet 1

Leo Pratt
INVENTOR
BY *CASnow+Leo.*
ATTORNEYS.

Jan. 12, 1954     L. PRATT     2,665,712
FLUID PRESSURE ACTUATED VALVE WITH STOP MEANS
Filed July 5, 1951     2 Sheets-Sheet 2

Leo Pratt
INVENTOR
BY *CA Snow &Co.*
ATTORNEYS.

Patented Jan. 12, 1954

2,665,712

UNITED STATES PATENT OFFICE 2,665,712

FLUID PRESSURE ACTUATED VALVE WITH STOP MEANS

Leo Pratt, Georgetown, S. C.

Application July 5, 1951, Serial No. 235,139

1 Claim. (Cl. 137—689)

This invention relates to a valve and control mechanism therefor and more particularly to a valve of the type employed for the blowing of a pressure vessel such as a digester.

The primary object of the invention is to facilitate the rapid replacement or repair of worn parts, with but a minimum expenditure of time or labor.

Another object is to facilitate the removal of matter which may deposit on the bottom head of the valve.

A further object is to prevent the collection of solid particles such as tramp iron between the valve seat and the valve head, and to lock the valve head in closing relation to the valve seat after the blowing operation has been effected.

The above and other objects may be attained by employing this invention which embodies among its features a valve having a valve seat through which extends a vertical passage, a substantially frusto-conical valve head mounted below the valve seat for movement with relation thereto axially of the passage extending through said seat, the sides of the conical valve head lying at a relatively steep angle to the horizontal so that solid particles such as tramp iron or the like will not collect on the valve head when the valve is open but will be deposited within the confines of the valve body.

Other features include a plunger connected to the valve head and extending through the valve body for advancing or retracting the valve head relative to the seat, means connected to the plunger for advancing or retracting said plunger relative to the valve seat and means mounted adjacent the plunger actuating means and moving in a path which intersects the path of movement of the plunger for engaging said plunger and holding it advanced toward the valve seat and the valve head in contact with the valve seat.

Still other features include means for removably supporting the valve seat on the valve body and on the neck of a digester so that when occasion requires, the valve seat may be removed from the assembly for replacement or repair and an access opening extending through the side of the valve body by which access may be had to the interior thereof for replacement or repair of the valve head.

Figure 1A:
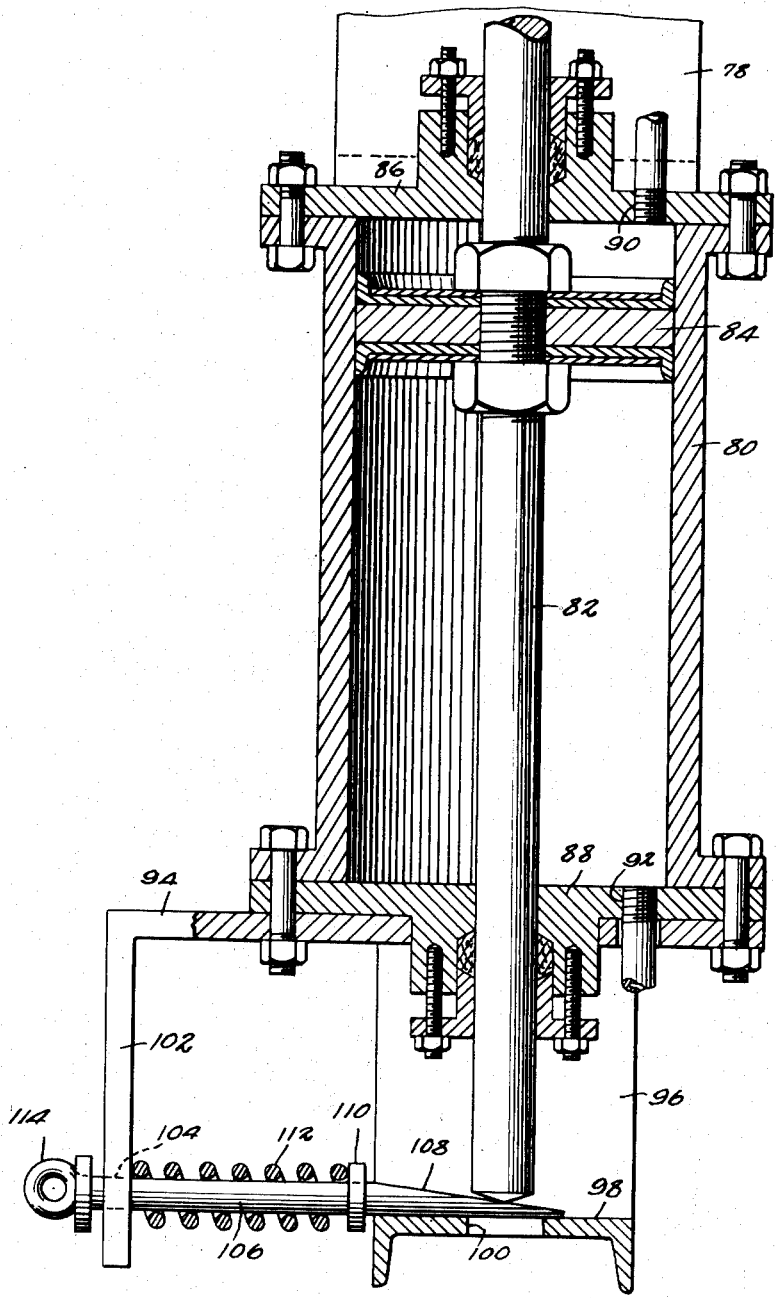

In the drawings,

Fig. 1 is a vertical sectional view through a valve embodying the features of this invention, and Fig. 1a is a vertical sectional view of the valve actuating and locking mechanism which aligns axially with the valve.

Referring to the drawings in detail, this improved valve comprises a tubular body 10 which is open at opposite ends and is provided at opposite ends with annular grooves 12 and 14 which open outwardly through the end of the valve body and inwardly into the interior thereof. Opening through one side of the valve body 10 is a fluid pressure inlet passage 16 which is surrounded by a laterally extending nipple 18 carrying adjacent its end remote from the body a coupling flange 20 by means of which the nipple 18 may be connected to any suitable source of fluid pressure supply. Opening through the side of the body opposite the opening 16 is an access opening 22 which is surrounded by a laterally extending nipple 24 carrying at its end remote from the body an outstanding annular coupling flange 26. A closure plug 28 enters the nipple 24 and carries at its outer end an outstanding annular flange 30 which is adapted to be coupled to the coupling flange 26 by suitable cap screws 32. The upper end of the valve body has secured thereto an outstanding annular coupling flange 34, and carried adjacent the lower end of the valve body 10 is an outstanding annular coupling flange 36.

A seat 38 is coupled to the flange 34 by suitable bolts 40, and this seat is provided with an annular rib 42 which extends from the lower face thereof and engages in the groove 12 of the body 10 in order to properly locate the parts when they are assembled. Extending through the seat 38 in substantial axial alignment with the valve body 10 is a relatively large passage or opening 44, and carried by the valve seat 38 and projecting therefrom in a direction opposite the valve body 10 in surrounding relation with the opening 44 is an annular row of circumferentially spaced studs 46. These studs are adapted to pass through an annular row of spaced openings 48 formed in the coupling flange 50 of the neck 52 of a conventional pressure vessel such as a digester, and in the preferred form of the invention the passage 44 in the valve seat 38 is of a diameter substantially equal to the diameter of the passage 54 within the neck 52.

The seat 38 is held against the coupling flange 50 of the digester neck 52 by means of nuts 56 which are threaded onto the studs 46 as will be readily understood upon reference to Fig. 1.

Secured as by bolts 58 to the attaching flange 36 of the valve body 10 is a head 60 through which extends an opening 62 which aligns axially with the passage 44 in the valve seat 38. A suitable annular guide rib 64 lies in substantially concentric spaced relation to the opening 62 and enters the annular groove 14 in the body 10 in order to properly locate the head 60 with relation to the valve body. Extending through the opening 62 in the head 60 is a plunger 66 and carried by the head 60 is a suitable packing gland 68 which surrounds the plunger and effects a fluid-tight junction between the plunger and the head 60. The plunger 66 is threaded externally as at 70 adjacent the end thereof which is disposed within the body 10, and threaded on the plunger is a valve head 72 of substantially conical form having sloping sides 74 which lie at a relatively steep angle to the horizontal so that any solid matter which engages the upper side of the head 72 will roll toward the periphery thereof and when the valve is open will fall into the valve body and rest on the head 60. A transversely extending bolt 76 extends through the head 72 and plunger 66 in order to hold the head against rotation relative to the plunger and yet to enable the head to be unscrewed from the plunger by removal of the bolt 76. It is to be noted that the access opening 20 is of a diameter that will enable the bolt 76 and head 72 to be removed from the plunger 66 and extracted through the passage 20 of nipple 24 should it become necessary to repair or replace the head.

Coupled as by a suitable supporting bracket 78 carried by the head 60 is an actuating cylinder 80 (Fig. 1a) through opposite ends of which extends a piston rod 82 which is coupled at its upper end in any suitable manner to the plunger 66 and has connected thereto within the cylinder 80 a piston 84. Heads 86 and 88 close opposite ends of the cylinder 80 and are provided with ports 90 and 92 respectively through which fluid pressure may be admitted to or discharged from the cylinder 80. Any other suitable plunger reciprocating means may be connected to the plunger 66 to advance or retract the valve head 72 relative to the seat 38, though for the sake of illustration, a fluid pressure or hydraulic type of plunger actuating mechanism has been selected for illustration. Carried by the head 88 of the cylinder 80 is a bracket 94 having a pair of depending legs 96 which are joined at their lower ends by a cross bar 98. This cross bar is provided in axial alignment with the piston rod 82 with an opening 100 through which the piston rod projects when the valve is in open position. A third depending leg 102 is carried by the bracket 94 and has formed therein adjacent its lower end an opening 104 in which a bolt 106 is mounted to slide. In the drawings (Fig. 1a) the bolt 106 moves in a rectilinear path which intersects the path of movement of the piston rod 82 and rides on the cross bar 98 and across the passage 100 formed therein. The bolt is provided adjacent the end which rides on the cross bar 98 with an inclined face 108 which increases in height as it approaches the bolt and engages the lower end of the piston rod 82 when the bolt is in its advanced position. An outstanding annular flange 110 is carried by the bolt 106 adjacent its junction with the inclined face 108 and surrounding the bolt and bearing at one end on the collar 110 and at its opposite end on the leg 102 is a compression coil spring 112 which yieldingly urges the bolt into its advanced position. The end of the bolt remote from that having the inclined face 108 is provided with an eye 114 to which any suitable retracting means may be coupled by which the bolt may be retracted against the effort of the coil spring 112 and clear of the opening 100 so as to allow the piston rod 82 to pass through the opening 100 when the valve head 72 is to be retracted from contact with the seat 38.

In use the valve is coupled as illustrated in Fig. 1 to the neck 52 of a conventional pressure vessel and the nipple 18 is connected to any suitable source of fluid pressure through the medium of the coupling flange 20. When it is desired to blow the pressure vessel, the bolt 106 is retracted from its position lying across the opening 100 and fluid pressure is admitted through the port 90 in the cylinder head 86 of the cylinder 80, thus causing the piston 84 to move downwardly within the cylinder 80 and to carry with it the piston rod 82. Downward movement of the piston rod 82 will cause the plunger 66 to move downwardly within the valve body 10 and draw the valve head 72 away from the seat 38 to clear the passage 44 for the fluid pressure entering the valve body through the passage 16. Should it be desired to replace or repair the valve head 72 the flow of fluid pressure through the opening 16 is discontinued and the plug 28 is removed from the opening 20 thus giving access through the opening 20 to the interior of the tubular body 10 so that the bolt 76 may be extracted and the head 72 unscrewed from the upper end of the plunger 66. Should replacement or repair to the seat 38 be required, it may be removed from the valve body by removing the bolts 40 and upon removing the nuts 56 from the studs 46 it is obvious that the seat 38 may be withdrawn from its position between the valve body and the neck 52. Upon admitting fluid pressure to the interior of the cylinder 80 through the port 92 and discharging the previously admitted fluid pressure through the port 90, it will be evident that the piston 84 will be moved upwardly within the cylinder 80 to thereby advance the valve head 72 into contact with the valve seat 38 to close the passage 44 therethrough. As the valve head 72 moves into passage closing position, the lower end of the piston rod will be withdrawn from the opening 100 and the bolt 106 under the influence of the spring 112 will advance toward the piston rod to bring the inclined surface 108 of said bolt into contact with the end of the piston rod 82 remote from the valve head 72. Through the effort of the spring 112 to advance the bolt 106 toward the piston rod 82, it will be evident that the inclined face 108 reacting against the lower end of the piston rod will force the head 72 into contact with the valve seat 38 and not only lock the valve head against downward movement, but will tend to urge the valve head into closer contact with the seat.

Any solid matter that may tend to collect on the valve head 72 will roll down the relatively steep tapered sides 74 thereof to drop into the valve body 10 and come to rest on the head 60. The clearing of such substances from the head 60 may be accomplished by extracting the threaded plugs 116 from the threaded openings 118 which extend through the head 60 and introducing pressure fluid to blow out the solid matter.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

Means for blowing a pressure vessel such as a digester comprising, a valve seat having an axial outlet opening extending therethrough, an elongated tubular valve body connected to the valve seat, said valve body having a fluid pressure inlet opening through the side thereof, a head closing the end of the tubular body remote from the valve seat, said head having an opening extending therethrough which aligns axially with the opening in the valve seat, a rod extending through the opening in the head, a valve head on the rod within the tubular body for cooperating with the seat in closing the opening therethrough, a cylinder carried by the head, a piston working within the cylinder, an elongated piston rod connected to the piston and extending through opposite ends of the cylinder, means connecting one end of the piston rod to the rod carrying the valve head, a support carried by the cylinder and having an opening extending therethrough in alignment with the piston rod, a bolt carried by the support and movable across the opening therein for engaging and holding the valve head against the valve seat, an outstanding flange carried by the bolt intermediate the ends thereof, a longitudinally inclined surface carried by the bolt for engaging the piston rod, and spring means encircling the bolt and engaging the flange with one end and the support with the opposite end, for advancing the bolt toward the piston rod and the inclined surface into engagement with said piston rod when the valve head engages the valve seat.

LEO PRATT.

References Cited in the file of this patent

UNITED STATES PATENTS

| Number | Name | Date |
|---|---|---|
| 1,034,298 | Proffitt | July 30, 1912 |
| 1,838,706 | Rogers | Dec. 29, 1931 |
| 1,848,175 | Jenkins | Mar. 8, 1932 |
| 1,873,070 | Tifft | Aug. 23, 1932 |
| 1,911,367 | Kitto | May 30, 1933 |
| 2,016,839 | Schoenberger | Oct. 8, 1935 |
| 2,254,472 | Dahl | Sept. 2, 1941 |

FOREIGN PATENTS

| Number | Country | Date |
|---|---|---|
| 103,341 | Australia | Feb. 24, 1933 |
| 632,806 | Great Britain | Dec. 5, 1949 |